United States Patent
Childers et al.

(10) Patent No.: US 6,382,267 B1
(45) Date of Patent: May 7, 2002

(54) FLUID FILL APPARATUS AND METHOD FOR HYDRAULIC MOUNT

(75) Inventors: Scott L. Childers, Kettering; John A. Walterbusch, Dayton; Raymond H. Louis, Union; Charles J. Cornor, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/835,681

(22) Filed: Apr. 16, 2001

(51) Int. Cl.[7] ............................................. B65B 31/04
(52) U.S. Cl. ...................... 141/65; 141/7; 141/301; 141/325; 141/364; 141/370; 141/383; 267/64.28
(58) Field of Search .............................. 141/7, 8, 4, 65, 141/236, 286, 301, 325, 363, 364, 369, 370, 383, 386; 267/64.28

(56) References Cited

U.S. PATENT DOCUMENTS

| | | | | |
|---|---|---|---|---|
| 4,114,866 A | * | 9/1978 | Kato ........................ 267/64 R |
| 4,828,234 A | * | 5/1989 | Hoying et al. ........... 267/140.1 |
| 5,524,871 A | * | 6/1996 | Muller et al. ............ 267/64.28 |
| 5,579,814 A | * | 12/1996 | Jones et al. ................. 141/383 |

* cited by examiner

Primary Examiner—Michael Powell Buiz
Assistant Examiner—Peter deVore
(74) Attorney, Agent, or Firm—Scott A. McBain

(57) ABSTRACT

Hydraulic mounts which include a body member, a partition, a diaphragm and a base member are placed on an apparatus for supporting the body member loosely assembled with the partition, diaphragm and base member. A head member engages the body member and the base member in temporary fluid sealing relationship while air is evacuated from internal chambers of the mount and hydraulic fluid is flowed into the chambers. The head member may then be moved away from the base member and a final assembly of the mount provided by crimping a peripheral upper edge of the body member in forcible engagement with the base member, the partition and the diaphragm. The mount may include spaced apart projections to allow fluid to flow between the partition and the body member during the air evacuation and fluid fill process.

18 Claims, 4 Drawing Sheets

FLUID FILL APPARATUS AND METHOD FOR HYDRAULIC MOUNT

FIELD OF THE INVENTION

The present invention pertains to a fluid fill apparatus and method for placing a hydraulic fluid charge in a hydraulic engine mount for automotive vehicles and the like.

BACKGROUND

In the production of hydraulic engine and powertrain mounts for automotive vehicles, conventional practice entails assembling the mount components, typically comprising an elastomer body, an orifice plate, a flexible diaphragm and a base plate, in fluid-tight assembly followed by drilling a hole through the elastomer body, evacuating air from the interior chambers of the mount, filling the mount with a suitable hydraulic fluid and then plugging the hole with a rivet-like closure member or the like. Accordingly, a multi-step process is required to finalize the assembly of the mount which is subject to certain inefficiencies and mount rejection rates due, for example, to incomplete fluid filling, contamination of the mount interior chambers as a consequence of the drilling operation and multiple handling steps.

Consequently, there has been a need to more efficiently carry out the process of assembling hydraulic engine mounts and the like to eliminate the multiple steps required by prior art fluid filling processes and the imperfections and mount failure rates which arise as a consequence of such prior art processes. Moreover, by eliminating the multiple-step process of drilling, filling and riveting, manufacturing time and labor content of the mount manufacturing process is reduced.

Still further, elimination of the prior art drilling and riveting processes would also eliminate the maintenance of and manufacturing downtime created by the manufacturing process stations which perform the drilling and riveting operations. It is to these ends that the present invention has been developed.

SUMMARY OF THE INVENTION

The present invention provides an apparatus for use in manufacturing hydraulic engine mounts and the like including, in particular, use in performing the steps of evacuating the interior chambers of the mount and filling the chambers with hydraulic fluid.

In accordance with one aspect of the present invention, an apparatus is provided which includes a housing or support member for a body member and orifice plate of a hydraulic mount, which support member is cooperable with a head member to place the mount components in assembly with each other, provide a substantially fluid-tight flow path for evacuation of air from within the interior chambers of the mount and provide for filling the mount with hydraulic fluid prior to sealing the components of the mount to each other.

In accordance with another aspect of the invention, an apparatus is provided which is adapted for carrying out a method of filling a hydraulic mount with a suitable hydraulic fluid wherein the requirement for a separate port and plug used for evacuating and filling the mount interior chambers is eliminated. In accordance with a method of the invention, the components of the mount including an elastomer body, a partition or orifice plate, a diaphragm and a base plate are loosely assembled in an apparatus of the invention, the mount components are held in assembly while air is evacuated from the pumping chamber, the orifice track and the fluid reservoir of the mount and such spaces are then filled with a suitable hydraulic fluid. The foregoing steps are preferably followed by the step of sealing the components of the mount in fluid-tight relationship with each other.

In accordance with yet a further aspect of the invention, an improved hydraulic mount is provided which is adapted for evacuating air from the mount interior chambers, filling the mount chambers and sealing the components of the mount in assembly with each other in fluid-tight relationship without the requirement of a drilled or otherwise formed air evacuation and fluid fill port and plug therefor.

Those skilled in the art will further appreciate the above-mentioned advantages and superior features of the invention together with other important aspects thereof upon reading the detailed description which follows in conjunction with the drawings.

BRIEF DESCRIPTION OF THE DRAWINGS

FIG. 1 is a longitudinal central section view of an apparatus for evacuating and filling the fluid chambers of a hydraulic engine mount and the like;

DETAILED DESCRIPTION OF THE PREFERRED EMBODIMENTS

Figure 1:
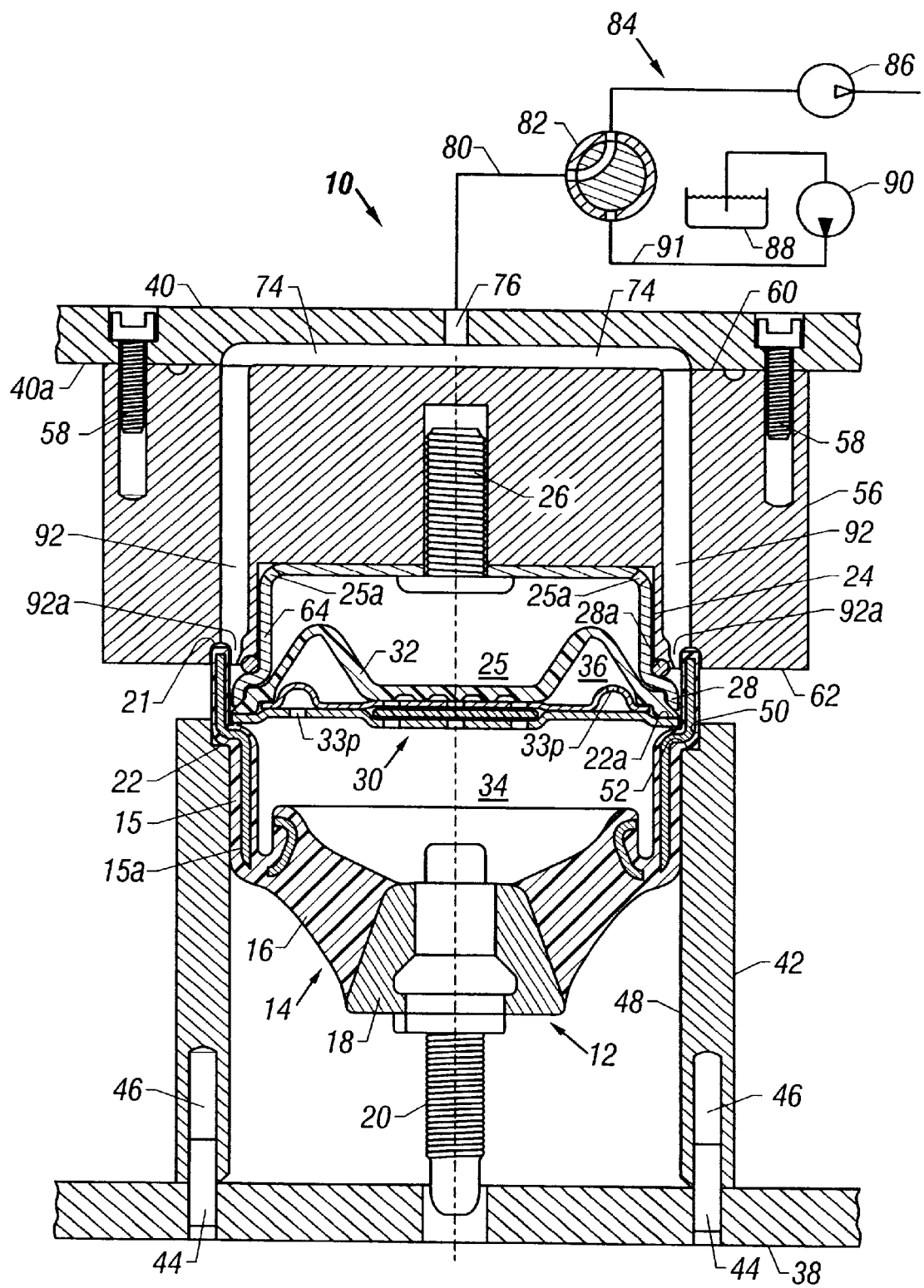

In the description which follows, like parts are marked throughout the specification and drawing with the same reference numerals, respectively. The drawing figures are not necessarily to scale and certain features may be shown exaggerated in scale or in generalized or schematic form in the interest of clarity and conciseness.

Figure 2:
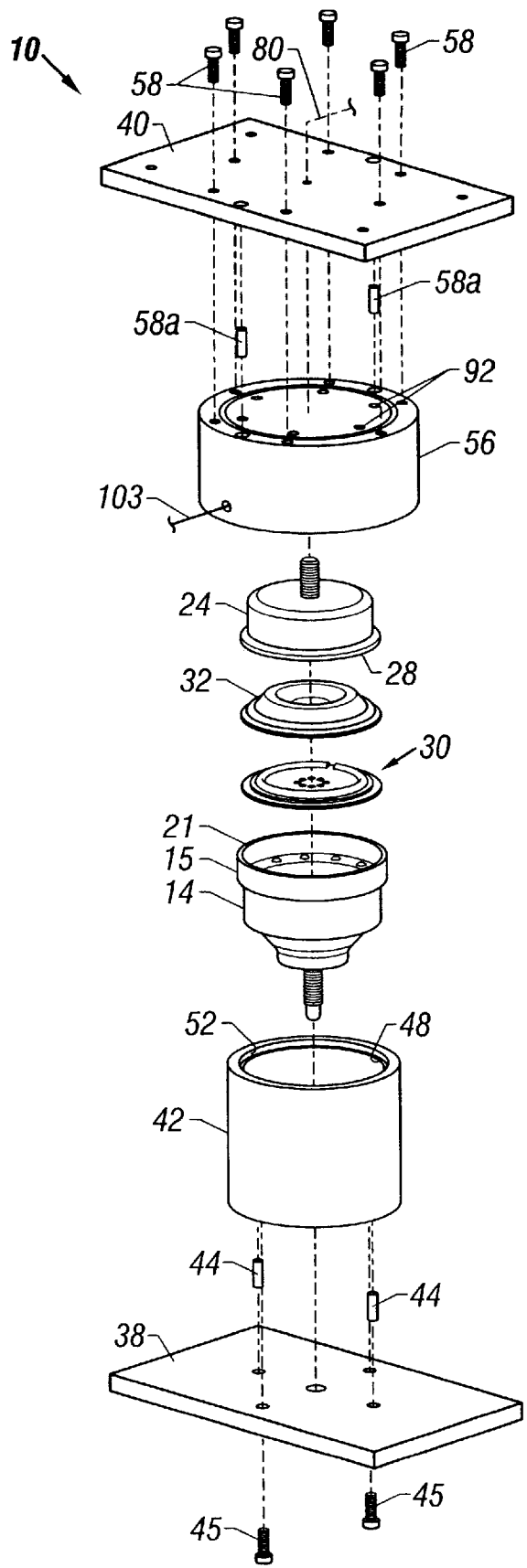
FIG. 2 is an exploded perspective view of the apparatus shown in FIG. 1.

Referring to FIGS. 1 and 2, there is illustrated an apparatus in accordance with the invention for filling the interior chambers of a hydraulic engine or powertrain mount, which apparatus is generally designated by the numeral 10. The apparatus 10 is adapted to evacuate the aforementioned interior chambers of a hydraulic mount 12 and to fill the chambers with a suitable hydraulic fluid, such as a mixture of water and ethylene glycol. A typical hydraulic mount 12 includes an elastomer body member 14 having an upstanding, generally cylindrical tubular body part 15 integral with a somewhat frustoconical body part 16 which is molded to a mounting element retainer 18 for supporting a post-type mounting element 20. Cylindrical body part 15 has an upper annular distal edge 21 and is preformed with a circumferential annular shoulder 22. Body part 15 is formed integral with an encapsulated circumferential metal reinforcing member 15a of conventional construction. The mount 12 also includes a generally cylindrical inverted somewhat can-shaped base member 24 which supports a second mounting element 26, preferably coaxial with the mounting element 20. The base member 24 is also formed with a radially outwardly displaced circumferential edge 28 which, as shown in FIGS. 1 and 5, is nested within the upper distal edge 21 of the body member 14, and forms an annular upward facing shoulder 28a.

Figure 5:
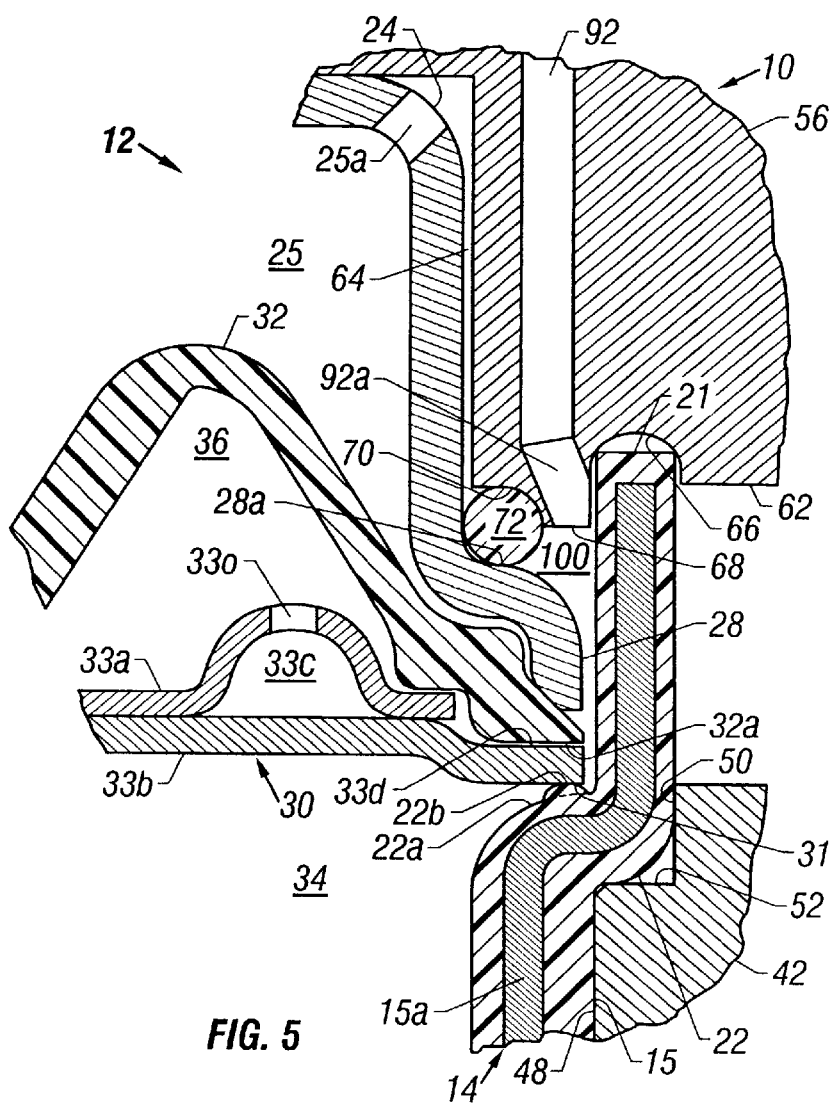
FIG. 5 is a detail section view of the apparatus shown in FIGS. 1 through 3 on a larger scale illustrating the positional relationship of the mount components during the air evacuating and fluid-filling process.

Referring to FIGS. 1 and 5, a partition 30 is interposed the body member 14 and the base member 24 and is contiguous with a cylindrical somewhat cup shaped flexible diaphragm member 32. The partition 30 and the diaphragm 32 are dimensioned in such a way as to be adapted to be interposed an inner wall 22a of shoulder 22 and the peripheral edge 28, FIG. 5, and trapped in fluid-tight sealing engagement with the body member 14 and the base member 24 subsequent to a fluid filling process to be described in further detail herein. A pumping chamber 34 formed between the body member 14 and the partition 30 and a fluid reservoir chamber 36 formed between the partition and the diaphragm 32, FIG. 1, are operable to be evacuated of air and filled with a liquid, such as the aforementioned hydraulic fluid, in accordance with the method of the invention as will be described in further detail herein.

Referring further to FIGS. 1 and 2, the apparatus 10 includes opposed generally planar plate-like frame members 38 and 40. Lower frame member 38 supports a generally cylindrical tubular housing or support member 42 for the mount body member 14. Support housing 42 is preferably located on frame member 38 by plural circumferentially spaced locating pins 44 which project upward from frame member 38 into respective pin-receiving bores 46 in housing 42. Housing 42 is secured to frame member 38 by suitable fasteners 45, FIG. 2, and includes an inner cylindrical bore wall 48 and an upward-facing counterbore 50 forming an annular shoulder 52, FIGS. 1 and 5, for supporting body member 14 at its annular shoulder 22.

As further shown in FIGS. 1 and 2, the apparatus 10 includes a second housing or head member 56 connected to the upper frame member 40 by suitable mechanical fasteners 58 and locating pins 58a, FIG. 2. Head member 56 is configured as a generally cylindrical block with an upper transverse end face 60, a lower transverse end face 62 and a cylindrical bore 64 opening to end face 62, see FIG. 5 also. As further shown in FIG. 5, end face 62 is intersected by an annular groove 66 for receiving the upper circumferential end 21 of body member 14. End face 62 is also intersected by an annular rim 68 which projects axially below the end face 62, as shown in FIG. 5, and includes a circumferential arcuate recess 70 formed therein. Recess 70 is adapted to support an elastomer o-ring-type seal member 72 secured to the head member 56 in the recess by a suitable adhesive, for example.

Figure 4:
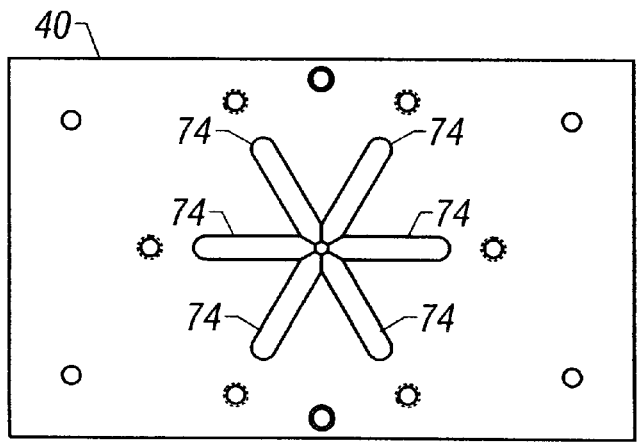
FIG. 4 is a bottom plan view of a top cover or frame member for the apparatus shown in FIGS. 1 through 3.

Referring further to FIGS. 1 and 4, the frame member 40 is provided with plural circumferentially spaced radially projecting grooves or passages 74 which intersect a central axial opening 76, FIG. 1, and open to face 40a of the frame member. Opening 76 is suitably connected to a conduit 80, FIG. 1, and a suitable valve 82 for an air-evacuating and liquid fill apparatus 84, which preferably includes a vacuum pump 86, a source of liquid 88 and a pump 90 connected to liquid source 88. Pumps 86 and 90 are suitably connected to valve 82 for alternately evacuating conduit 80, opening 76 and passages 74 and filling the spaces thereof with liquid 90.

As further shown in FIGS. 1 and 5, head member 56 includes plural, circumferentially spaced, axially extending passages 92 formed therein and opening to upper transverse end face 60 in registration with grooves 74, respectively. The opposite ends of passages 92 open through ports 92a, one shown in FIG. 5. Accordingly, air may be evacuated through ports 92a, passages 92, grooves 74 and opening 76 by way of valve 82 in the position shown in FIG. 1. Conversely, if valve 82 is positioned to place conduit 80 in communication with pump 90 by way of conduit 91, FIG. 1, liquid from source 88 may be pumped through conduit 80, opening 76, grooves 74, passages 92 and out through ports 92a.

Figure 6:
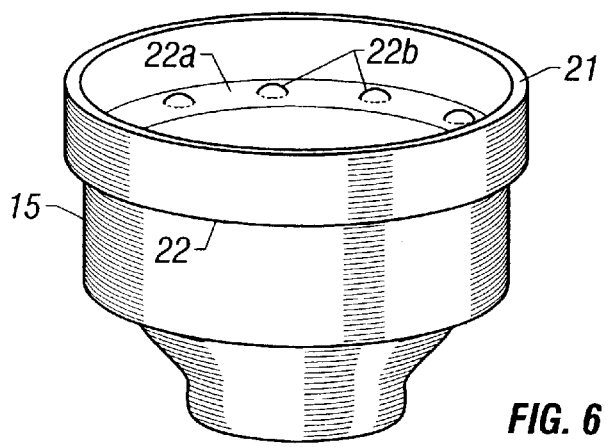
FIG. 6 is a detail perspective view of a portion of the mount body for the hydraulic mount in accordance with the present invention and illustrating the partition standoff projections for the mount body.

Referring primarily to FIG. 5, when it is desired to fill the mount 12 with hydraulic fluid, body member 14 is placed in housing 42 in the position shown in FIGS. 1 and 2 and partition 30 is placed within the interior of body member 14 adjacent inner wall 22a of shoulder 22. As shown in FIGS. 5 and 6, body member 14 is preferably provided with a plurality of circumferentially spaced bead-like projections 22b integrally formed with the elastomer portion of body member 14, as illustrated. Projections 22b extend from wall 22a of shoulder 22, as shown, and are engageable with a downward-facing circumferential surface 31 of partition 30 to hold the partition in a slight standoff position from wall 22a to allow the flow of fluid between partition 30 and shoulder 22 during the mount evacuation and fluid fill process of the invention.

Partition 30 is preferably configured as an orifice plate assembly including contiguous orifice plate members 33a and 33b which are suitably joined together to form an annular passage or orifice track 33c. Orifice track 33c intersects suitable circumferentially spaced ports 33o and 33p, FIG. 1, formed in the orifice plates 33a and 33b, respectively, for allowing fluid flow communication between the chambers 34 and 36 by way of orifice track 33c in a known manner.

Referring further to FIG. 5, after placement of the orifice plate assembly or partition 30 within the body member 14 in the position shown, diaphragm 32 is placed loosely on top of the partition. Diaphragm 32 includes a circumferential rim 32a which is adapted to be disposed in fluid-tight sealing engagement with surface 33d of orifice plate 33b when the mount 12 is fully assembled. However, during the air evacuation and liquid fill process, the diaphragm 32 is resting loosely on Circumferential orifice plate surface 33d, as shown in FIG. 5, and may provide a relatively narrow gap between the rim 32a and the surface 33d. As further shown in FIG. 5, the rim or edge 28 of base member 24 is engageable with the rim 32a at a sloped surface 28b.

Accordingly, the apparatus 10 is operable to evacuate air from the chambers 34 and 36 and the orifice track 33c of the mount 12 and fill the aforementioned spaces with a hydraulic fluid prior to the final steps for assembling the mount 12. As described above, the body member 14 is placed in the housing 42 in the position shown in FIGS. 1 and 5, then, preferably, the partition 30 and the diaphragm 32 are placed in the positions shown, followed by placing the base member 24 over the diaphragm and partition generally in the position shown in FIGS. 1 and 5. In this condition, the partition 30, the diaphragm 32 and the base member 24 are loosely resting on the body member 14.

The head 56 is then moved into the position shown in FIGS. 1 and 5 such that the elastomer o-ring seal 72 is in substantial fluid-sealing engagement with the base member 24, preferably at shoulder 28a, FIGS. 1 and 5, and the upper distal end 21 of the body member 14 is in fluid sealing engagement with the head member 56 at the groove or recess 66. In this condition, the body member 14, the partition 30, the diaphragm 32 and the base member 24 are still in relatively slack engagement with each other. Accordingly, air may be evacuated from the chambers 34 and 36 and the orifice track 33c by placing valve 82 in the position shown in FIG. 1 and operating vacuum pump 86 to substantially evacuate air from the aforementioned chambers and the orifice track. Air may flow out of chamber 36 through a gap which may form between rim 32a and surface 33d, particularly when a differential pressure develops between the chamber 36 and an annular space 100 substantially delimited by body part 15, the peripheries of partition 30, diaphragm 32 and base plate 24, and the head 56. Annular space 100 is in fluid flow communication with the passages 92 and ports 92a. During the air evacuation process, air is withdrawn from chamber 34 through spaces formed between the shoulder inner wall 22a and the bottom surface 31 of orifice plate 33b and between the projections 22b. If surfaces 32a and 33d are forcibly engaged all fluid flow between space 100 chamber 36 and orifice track 33c may be via chamber 34.

Upon evacuation of a sufficient amount of air from the chambers 34 and 36 and the orifice track 33c, valve 82 is moved to a position to place the source of hydraulic fluid 88 in communication with conduit 80, opening 76, grooves 74, passages 92 and ports 92a, and hydraulic fluid is withdrawn or pumped from source 88 into the annular space 100 and into the chamber 34, at least. If the diaphragm 32 has become forcibly engaged with the surface 33d at the rim 32a, hydraulic fluid will still flow from chamber 34 into the orifice track 33c and the chamber 36 through the aforementioned ports in the orifice plates 33a and 33b. Thanks to the air evacuation process, the chambers 34 and 36 and the orifice track 33c will be substantially completely filled with hydraulic fluid during the fluid fill step.

Once the hydraulic fluid fill step has been completed, valve 82 is rotated to a position to block communication of fluid or vacuum through conduit 80 and the passages connected thereto. Moreover, viewing FIG. 3, a port 102 in housing 56 may be vented to atmosphere by way of conduit 103 and valve 105 to assure that the head 56 will release from the base member 24 in case any vacuum condition has been created between these members in bore 64 as a consequence of the air evacuation step. The frame member 40 and head 56 may then be removed from the assembled mount 12 and, for example, the frame member 38 and housing 42 moved to another station, not shown, for operation to final assemble the mount components. Alternatively, a suitable crimping head, not shown, may be moved into position above housing 42. The aforementioned crimping head may then be lowered into engagement with the upper annular distal end 21 of upper wall part 15 to bend or crimp a portion of body part 15 above the shoulder 22, viewing FIGS. 1 and 5, and the end 21 radially inwardly and into forcible engagement with the annular shoulder 28a which will then compress the elastomer projections 22b to bring the partition 30 into fluid-tight sealing engagement with the body member 14 at inner wall 22a and with the diaphragm 32 at surface 33d to complete the assembly of the mount 12 in a conventional manner. Upon performance of the crimping operation to join the members 14, 30, 32 and 24 together, the mount 12 has been suitably filled with hydraulic fluid and the aforementioned members are joined in fluid-tight sealing relationship to each other to prevent leakage of fluid out of the chambers 34 or 36 to the exterior of the mount or into a cavity 25 formed between the diaphragm 32 and the interior of the base member 24.

The construction of the apparatus 10 and the method of operation of same to provide for filling a hydraulic mount in accordance with the invention is believed to be readily understandable to one of ordinary skill in the art based on the foregoing description. Conventional engineering materials for engine mount assembly fixtures may be used in constructing the apparatus 10. Moreover, the mount 12 may be of generally conventional construction. However, the mount 10 enjoys the benefits of the improved body member 14 which has been configured to advantageously include the projections 22b. In fact, the rim 32a of the diaphragm 32 may also be provided with circumferentially spaced compressible projections, not shown, to hold the rim in a slight standoff position from the surface 33d of the orifice plate 33b during the evacuation and fluid fill process. The aforementioned projections for the rim 32a may also be compressed when the projections 22b are compressed or deflected so that a fluid-tight seal is formed between the diaphragm 32 and the orifice plate 33b during the final assembly process described above for the mount 12. The mount 12 and apparatus 10 are adapted for generally cylindrical mount configurations. However, other shapes of mount members and apparatus members to accommodate same may be provided.

In the aforementioned mount fill and final assembly process, when the head 56 is retracted away from the base plate 24 and a crimping head is moved into position to perform the final assembly, the annular space 100 remains filled with hydraulic fluid. Even though the component parts of the mount 12 are now held only loosely in assembly by the weight of the respective components, hydraulic fluid will not leak out of the chambers 36 or 34 or the orifice track 33c due at least in part to the static pressure head provided by the level of hydraulic fluid residing in the annular space 100.

Figure 3:
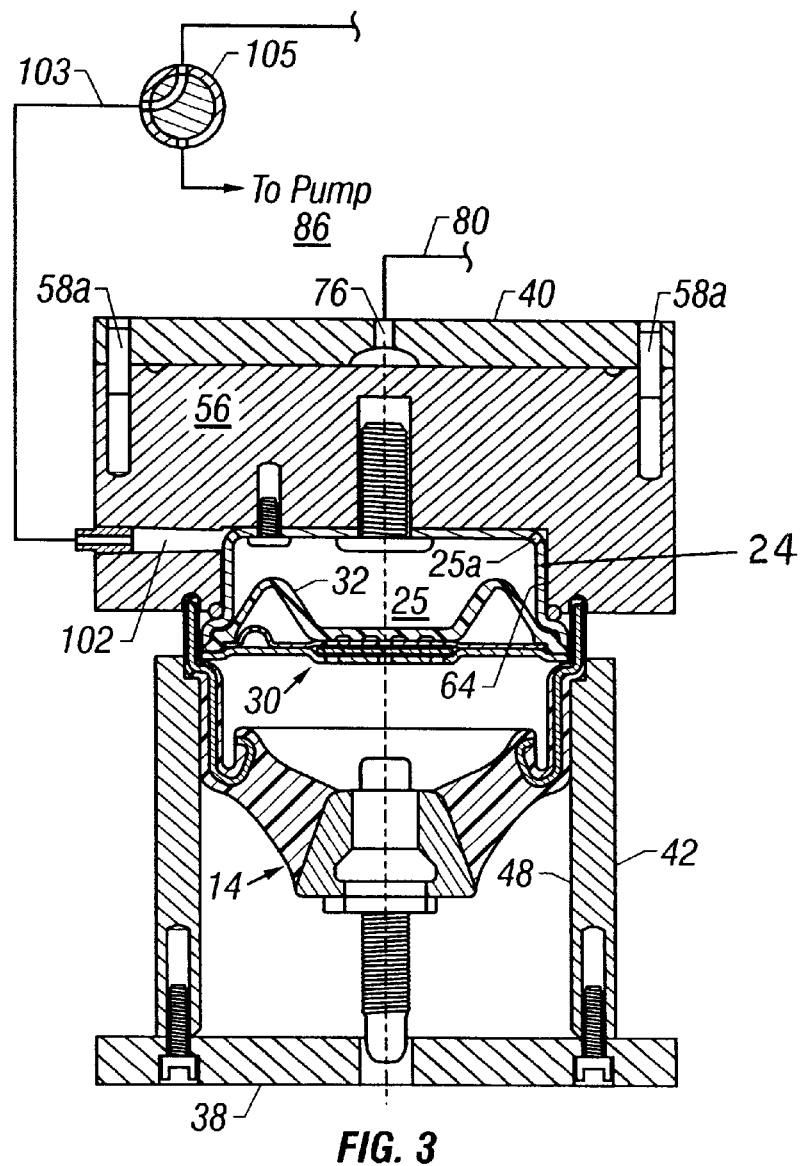
FIG. 3 is a central section view of the apparatus shown in FIGS. 1 and 2 taken through a plane different from the section view of FIG. 1 to illustrate further features of the apparatus.

An alternative process in accordance with the invention for filling the mount 12 with hydraulic fluid may comprise the steps of placing the head 56 in the position shown in FIGS. 1, 3 and 5 without the annular o-ring seal 72 provided in the recess 70. Accordingly, the bore 64 of the head 56 may be evacuated of air through port 102, conduit 103 and valve 105 which may be suitably connected to the vacuum pump 86 also. As shown in FIGS. 3 and 5, base member 24 is provided with one or more ports 25a formed therein and opening into the space 25 between the base member and the diaphragm 32. Accordingly, during the air evacuation step, chambers 34 and 36 and orifice track 33c will be evacuated as will the space 25 and any space in the bore 64 between the bore and the base member 24.

In the alternative method of evacuating air from and filing the mount 12 with a hydraulic fluid, upon evacuation of air as described immediately above, valve 82 will be rotated to place the source 88 of hydraulic fluid in communication with the annular space 100 and hydraulic fluid will flow into the chambers 34 and 36 and the space 33c. Port 102 may be placed in communication with ambient atmospheric pressure by movement of the valve 105 to an alternate position after the chambers 34 and 36 and the orifice track 33c become filled. In this way, hydraulic fluid will not tend to fill the space 25 and the space between the bore 64 and the base plate 24. The annular space 100 will remain full of hydraulic fluid as the head 56 is retracted away from the base plate 24 upon completion of the fluid filling process. In this way chambers 34 and 36 and orifice track 33c will remain full of hydraulic fluid until the aforementioned crimping operation is carried out to cause body part 14 to be forcibly engaged with the other components of the mount 12 as previously described. Any hydraulic fluid which might flow into the space 25 or the space between the bore 64 and the base member 24 will flow out of these spaces upon removal of the mount 12 from the apparatus 10 and upon inversion of the mount so that any hydraulic fluid in the space 25 may drain out through the ports 25a.

Although preferred embodiments of the invention have been described in detail herein, those skilled in the art will recognize that various substitutions and modifications may be made without departing from the scope and spirit of the appended claims.

What is claimed is:

1. An apparatus for evacuating air from internal chambers of a hydraulic mount and filling said chambers with a hydraulic fluid, said mount including a body member, a partition, a flexible diaphragm and a base member adapted to be joined in assembly to form said chambers between said body member and said partition and between said partition and said diaphragm, said apparatus comprising:

a housing for supporting said body member in a position wherein said body member may support said partition, said diaphragm and said base member;

a head member adapted to be placed over said base member and engageable with said body member and at least partially delimiting space formed between said base member and said body member; and passage means formed in one of said housing and said head member and in fluid flow communication with said space, with a source of vacuum and with a source hydraulic fluid for evacuating air from said chambers of said mount and for filling said chambers with hydraulic fluid, respectively.

2. The apparatus set forth in claim 1 wherein:

said head member includes a seal member mounted thereon and engageable with said base member to form a fluid-tight seal between said head member and said base member.

3. The apparatus set forth in claim 1 wherein:

said head member includes a recess formed therein for receiving a distal end of said body member in substantially fluid-tight sealing relationship.

4. The apparatus set forth in claim 1 including:

a shoulder formed on said housing and engageable with a cooperating shoulder formed on said body member for supporting said body member in said housing.

5. The apparatus set forth in claim 4 including:

a bore formed in said housing for receiving said body member therein and in engagement with said shoulder formed on said housing.

6. The apparatus set forth in claim 1 including:

a bore formed in said head member for receiving said base member therein upon engagement of said head member with said body member.

7. The apparatus set forth in claim 1 including:

a lower frame member for supporting said housing thereon.

8. The apparatus set forth in claim 1 wherein:

said head member includes a bore for receiving said base member therein and a port opening into said bore and adapted to be placed in communication with a source of vacuum, and valve means for controlling the pressure in said bore during one of evacuating air from said chambers of said mount and filling said chambers with hydraulic fluid.

9. The apparatus set forth in claim 1 including:

an upper frame member supporting said head member thereon, said upper frame member including passage means therein in communication with passage means in said head member for communicating fluid between said source of vacuum and said source of hydraulic fluid with said chambers of said mount.

10. The apparatus set forth in claim 1 including:

a conduit in communication with said passage means and with valve means for selectively placing said passage means in fluid flow communication with a source of vacuum and with a source of hydraulic fluid for selectively evacuating air from said chambers of said mount and for filling said chambers with hydraulic fluid, respectively.

11. A method for evacuating air from one or more internal chambers of a hydraulic mount and filling said chambers with a hydraulic fluid, said mount including a body member, a partition, a diaphragm and a base member adapted to be assembled to form said chambers, said method comprising the steps of:

providing an apparatus for supporting said mount, said apparatus being operable to be in communication with a source of vacuum and a source of hydraulic fluid;

placing said mount in said apparatus;

evacuating air from said chambers; and filling said chambers with hydraulic fluid prior to forcibly securing said body member, said partition, said diaphragm and said base member in assembly.

12. The method set forth in claim 11 wherein:

said apparatus includes a housing for supporting said body member and said body member is configured to support said partition loosely supported on said body member and operable to form passage means between said partition and said body member for evacuating air from and filling at least one chamber with said hydraulic fluid.

13. The method set forth in claim 12 wherein:

said apparatus includes a head member engageable with said body member and said method includes the steps of:

placing said head member in engagement with said body member while said body member is supported by said housing and evacuating air from said at least one chamber formed between said body member and said partition through said passage means.

14. The method set forth in claim 13 including the step of:

placing said head member in fluid tight sealing engagement with said base member prior to evacuating air from and filling said chambers with said hydraulic fluid.

15. The method set forth in claim 12 including the step of:

evacuating air from a space formed between said head member and said base member prior to filling said chambers with hydraulic fluid.

16. The method set forth in claim 11 including the step of:

filling an annular space formed between said body member and said base member with hydraulic fluid while filling said chambers of said mount with hydraulic fluid.

17. The method set forth in claim 16 including the step of:

bending a part of said body member into engagement with said base member to secure said body member, said partition, said diaphragm and said base member in fluid tight sealing relationship with each other while displacing fluid from said annular space.

18. The method set forth in claim 11 including the step of:

providing at least one of said body member and said diaphragm with projection means formed thereon to provide a standoff position between said partition and said one of said body member and said diaphragm to establish a fluid flow passage between said one of said body member and said diaphragm and said partition for fluid flow into and out of said chambers of said mount.

* * * * *